(12) United States Patent
Pan et al.

(10) Patent No.: US 12,439,417 B2
(45) Date of Patent: Oct. 7, 2025

(54) SYSTEM AND METHOD FOR DETERMINING TRANSMISSION INFORMATION

(71) Applicant: ZTE CORPORATION, Guangdong (CN)

(72) Inventors: Yu Pan, Shenzhen (CN); Chuangxin Jiang, Shenzhen (CN); Gang Li, Shenzhen (CN); Shujuan Zhang, Shenzhen (CN); Bo Gao, Shenzhen (CN); Zhaohua Lu, Shenzhen (CN); Zhen He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 327 days.

(21) Appl. No.: 17/877,220

(22) Filed: Jul. 29, 2022

(65) Prior Publication Data
US 2023/0017176 A1    Jan. 19, 2023

Related U.S. Application Data

(63) Continuation of application No. PCT/CN2020/121773, filed on Oct. 19, 2020.

(51) Int. Cl.
*H04W 72/23* (2023.01)
*H04W 24/08* (2009.01)
*H04W 72/0446* (2023.01)

(52) U.S. Cl.
CPC ........... *H04W 72/23* (2023.01); *H04W 24/08* (2013.01); *H04W 72/0446* (2013.01)

(58) Field of Classification Search
CPC . H04W 72/23; H04W 24/08; H04W 72/0446; H04W 48/12; H04W 72/231;
(Continued)

(56) References Cited

U.S. PATENT DOCUMENTS

2020/0221428 A1    7/2020  Moon et al.
2020/0351896 A1*  11/2020  Taherzadeh Boroujeni ................
                                                                H04L 5/001
(Continued)

FOREIGN PATENT DOCUMENTS

CN        104202828 A    12/2014
CN        110536451 A    12/2019
(Continued)

OTHER PUBLICATIONS

International Search Report and Written Opinion for PCT Appl. No. PCT/CN2020/121773, mailed Jul. 30, 2021 (8 pages).
(Continued)

*Primary Examiner* — Sharmin Chowdhury
(74) *Attorney, Agent, or Firm* — Foley & Lardner LLP

(57) ABSTRACT

A system and method for wireless communication are disclosed herein. Example implementations includes a wireless communication method of receiving a first control information and a second control information, wherein the first control information comprises a first format, and the second control information comprises a second format, and determining that the second control information is a repeat of the first control information based at least in part on the first format and the second format. Example implementations further include a method where each of the first control information and the second control information is Downlink Control Information (DCI), the first control information comprises a first field containing a first index, the first control information comprises a second field containing a second index, and the field is scrambled by a network identifier.

12 Claims, 10 Drawing Sheets

(58) Field of Classification Search
CPC ... H04W 72/232; H04L 5/0094; H04L 5/0053
See application file for complete search history.

(56) References Cited

U.S. PATENT DOCUMENTS

| | | | | |
|---|---|---|---|---|
| 2020/0413412 | A1* | 12/2020 | Kim | ........................ H04W 24/08 |
| 2021/0195601 | A1* | 6/2021 | Khoshnevisan | .. H04W 72/0466 |
| 2022/0210679 | A1* | 6/2022 | Cirik | ..................... H04L 1/1812 |
| 2022/0329386 | A1 | 10/2022 | Ye et al. | |
| 2023/0125672 | A1* | 4/2023 | Grossmann | ....... H04W 72/1273 |
| 2023/0363005 | A1* | 11/2023 | Cirik | ..................... H04W 72/23 |

FOREIGN PATENT DOCUMENTS

| | | |
|---|---|---|
| CN | 110635866 A | 12/2019 |
| WO | WO-2019/139955 A1 | 7/2019 |

OTHER PUBLICATIONS

Examination Report No. 1 for AU Appl. No. 2020473569, dated Jan. 12, 2024 (3 pages).
CMCC, "Enhancements on Multi-TRP for PDCCH, PUCCH and PUSCH" 3GPP TSG RAN WG1 #102-e, R1-2006201, Aug. 28, 2020, e-Meeting (2 pages).
Futurewei, "Multi-TRP/panel for non-PDSCH" 3GPP TSG RAN WG1 #103-e, R1-2007540, Nov. 13, 2020, e-Meeting (19 pages).
LG Electronics, "Enhancements on beam management for multi-TRP" 3GPP TSG RAN WG1 #102-e, R1-2006599, Aug. 28, 2020, e-Meeting (5 pages).
LG Electronics, "Enhancements on beam management for multi-TRP" 3GPP TSG RAN WG1 #103-e, R1-2008576, Nov. 13, 2020, e-Meeting (7 pages).
Moderator (Samsung), "Moderator summary for Rel. 17 FeMIMO EVM offline" 3GPP TSG RAN WG1 #102-e, R1-2006126, Aug. 28, 2020, e-Meeting (21 pages).
NTT Docomo, Inc., "Discussion on MTRP for reliability" 3GPP TSG RAN WG1 #102-e, R1-2006719, Aug. 28, 2020, e-Meeting (7 pages).
NTT Docomo, Inc., "Discussion on MTRP for reliability" 3GPP TSG RAN WG1 #103-e, R1-2009175, Nov. 13, 2020, e-Meeting (11 pages).
Qualcomm Incorporated, "Summary #2 of email discussion [102-e-NR-feMIMO-02]" 3GPP TSG RAN WG1 Meeting #102-e, R1-2007181, Aug. 28, 2020, e-Meeting (13 pages).
VIVO, "Discussion on enhancement on PDCCH, PUCCH, PUSCH in MTRP scenario", 3GPP TSG RAN WG1 #102-e, R1-2005364, Aug. 28, 2020, e-Meeting (12 pages).
VIVO, "Further discussion on enhancement of MTRP operation" 3GPP TSG RAN WG1 #103-e, R1-2007645, Nov. 13, 2020, e-Meeting (15 pages).
Office Action on KR Appl. No. 10-2023-7016563, dated Jun. 16, 2025 (9 pages, including English translation).

\* cited by examiner

SYSTEM AND METHOD FOR DETERMINING TRANSMISSION INFORMATION

CROSS-REFERENCE TO RELATED APPLICATION

This application claims the benefit of priority under 35 U.S.C. § 120 as a continuation of PCT Patent Application No. PCT/CN2020/121773, filed on Oct. 19, 2020, the disclosure of which is incorporated herein by reference in its entirety.

TECHNICAL FIELD

The disclosure relates generally to wireless communications and, more particularly, to systems and methods for determining transmission information.

BACKGROUND

In wireless communication, repetition of control information may cause degraded operation of a wireless communication device or UE. Conventional UE cannot identify or distinguish repetition of control information or transmission information with sufficient effectiveness. Thus, a technological solution for determining transmission information is desired.

SUMMARY

The example implementations disclosed herein are directed to solving the issues relating to one or more of the problems presented in the prior art, as well as providing additional features that will become readily apparent by reference to the following detailed description when taken in conjunction with the accompany drawings. In accordance with various implementations, example systems, methods, devices and computer program products are disclosed herein. It is understood, however, that these implementations are presented by way of example and are not limiting, and it will be apparent to those of ordinary skill in the art who read the present disclosure that various modifications to the disclosed implementations can be made while remaining within the scope of this disclosure.

In one implementation, a method performed by a wireless communication device includes receiving a first control information and a second control information, wherein the first control information comprises a first format, and the second control information comprises a second format, and determining that the second control information is a repeat of the first control information based at least in part on the first format and the second format.

In another implementation, a method performed by a wireless communication device includes a method where each of the first control information and the second control information is Downlink Control Information (DCI), the first control information comprises a first field containing a first index, the first control information comprises a second field containing a second index, and the field is scrambled by a network identifier.

In another implementation, a method performed by a wireless communication device includes a method where the first control information and the second control information are received continuously.

In another implementation, a method performed by a wireless communication device includes determining, by the wireless communication device from a bitmap, that the first MO and the second MO are associated.

In another implementation, a method performed by a wireless communication device includes a method where a first SS set has a first monitoring period, a second SS set has a second monitoring period, the first monitoring period and the second monitoring period are the same, the first SS set has a highest SS index in the plurality of SS sets, and the second SS set has a lowest SS index in the plurality of SS sets.

In another implementation, a method performed by a wireless communication device includes a method where the first SS set has a highest SS index in a plurality of SS sets, and the second SS set has a lowest SS index in the plurality of SS sets.

In another implementation, a method performed by a wireless communication device includes a method where the first control information is received in a first Monitoring Occasion (MO), the first MO is in a first Search Space (SS) set and has a first monitoring period, the second control information is received in a second MO, the second MO is in a second SS set and has a second monitoring period, and the first monitoring period and the second monitoring period are the same.

In one implementation, a method performed by a wireless communication node includes sending, by a network to a wireless communication device, a first control information and a second control information, where the first control information comprises a first format, and the second control information comprises a second format, and where the second control information is a repeat of the first control information based at least in part on the first format and the second format, and communicating, by the network with the wireless communication device, data based on the first control information.

The above and other aspects and their implementations are described in greater detail in the drawings, the descriptions, and the claims.

BRIEF DESCRIPTION OF THE DRAWINGS

Various example implementations of the present solution are described in detail below with reference to the following figures or drawings. The drawings are provided for purposes of illustration only and merely depict example implementations of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE IMPLEMENTATIONS

Various example implementations of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example implementations and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
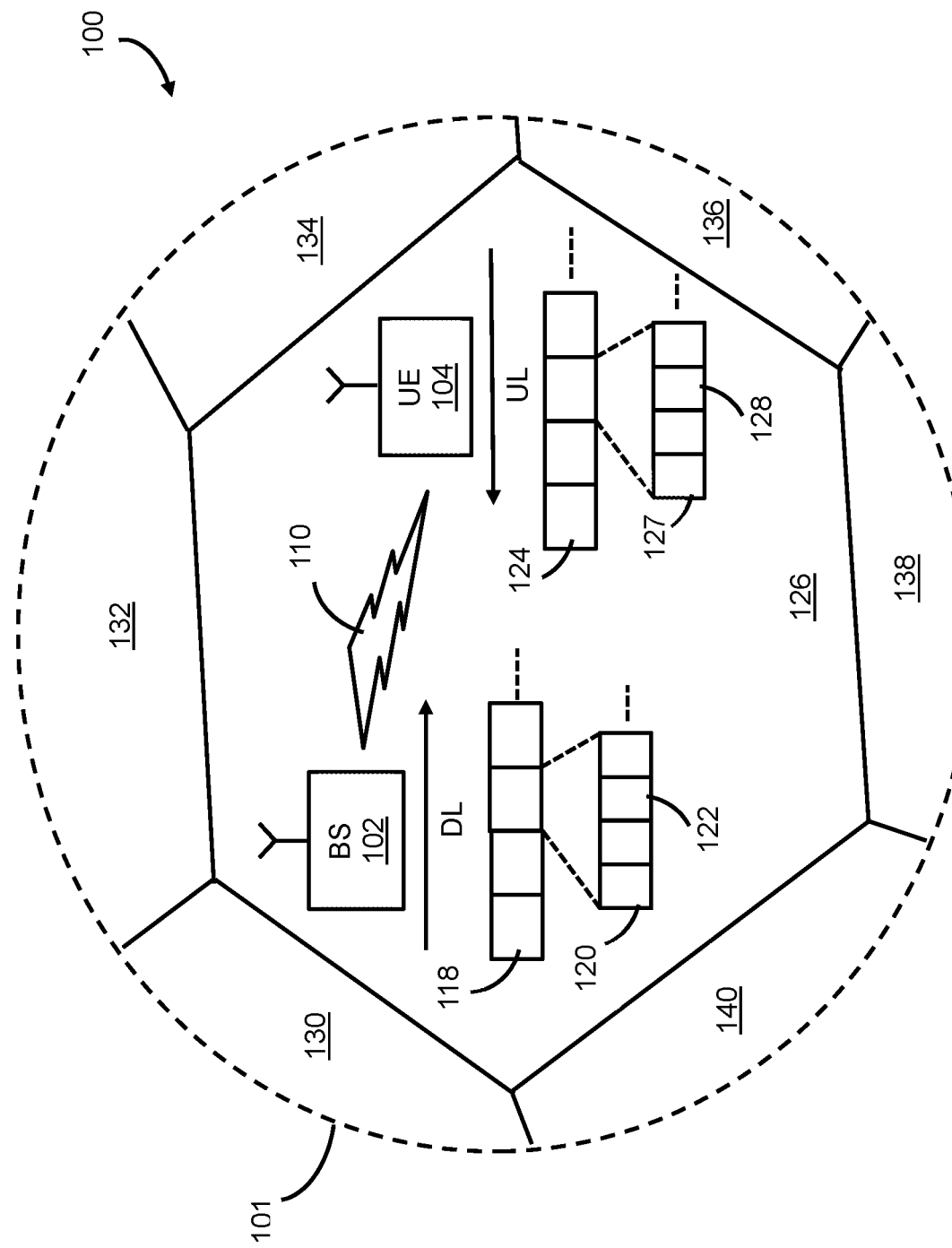
FIG. 1 illustrates an example cellular communication network in which techniques and other aspects disclosed herein may be implemented, in accordance with an implementation of the present disclosure.

FIG. 1 illustrates an example wireless communication network, and/or system, 100 in which techniques disclosed herein may be implemented, in accordance with an implementation of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various implementations of the present solution.

Figure 2:
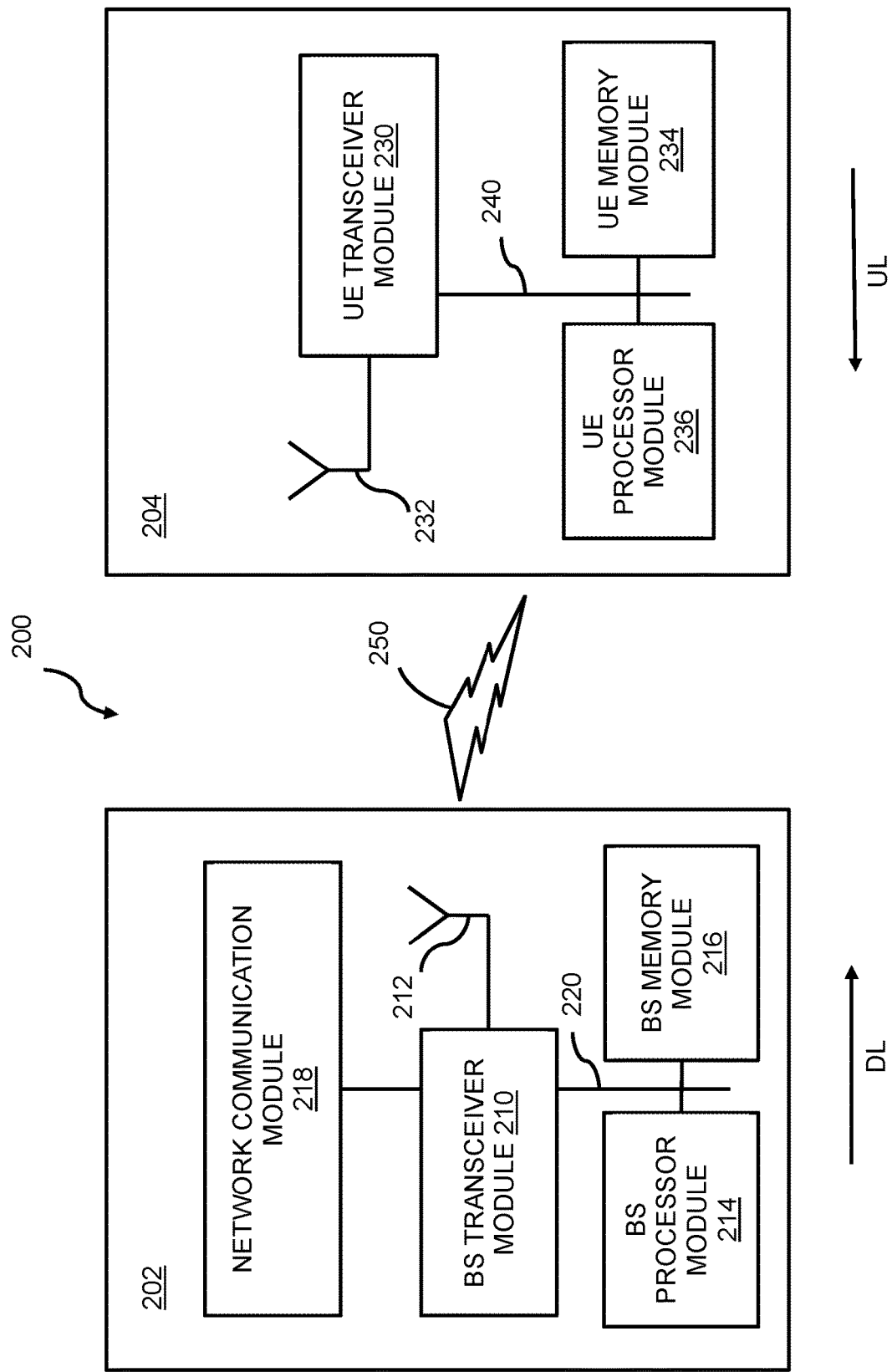
FIG. 2 illustrates block diagrams of an example base station and a user equipment device, in accordance with some implementations of the present disclosure.

FIG. 2 illustrates a block diagram of an example wireless communication system 200 for transmitting and receiving wireless communication signals, e.g., OFDM/OFDMA signals, in accordance with some implementations of the present solution. The system 200 may include components and elements configured to support known or conventional operating features that need not be described in detail herein. In one illustrative implementation, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the implementations disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some implementations, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some implementations, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some implementations, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative implementations, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various implementations, the BS 202 may be an evolved node B (eNB), a serving eNB, a target eNB, a femto station, or a pico station, for example. In some implementations, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the implementations disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some implementations, memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Figure 3:
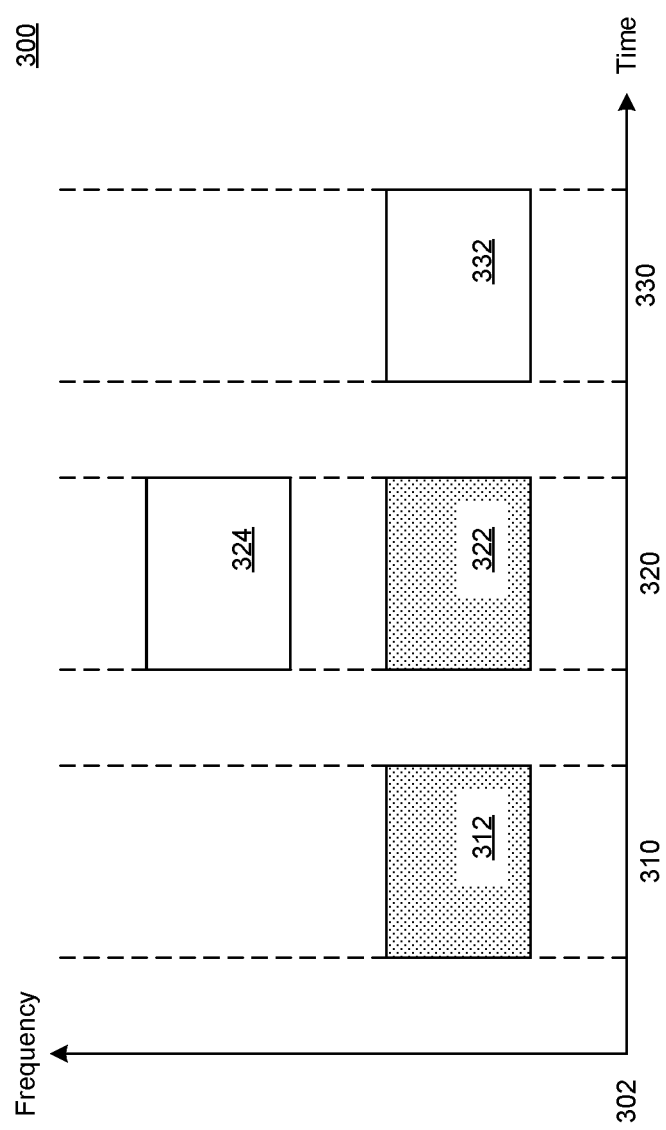
FIG. 3 illustrates a wireless communication device performing a first determination that a second downlink control information is a repeat of first downlink control information, in accordance with some implementations of the present disclosure.

FIG. 3 illustrates a wireless communication device performing a first determination that a second downlink control information is a repeat of first downlink control information, in accordance with some implementations of the present disclosure. As illustrated by way of example in FIG. 3, example wireless communication 300 extends in an x-axis time direction and a y-axis frequency direction, and includes CSS1 302 arranged in a first monitoring occasion 310, a second monitoring occasion 320, and a third monitoring occasion 330. In some implementations, the CSS1 302 includes downlink control information 312, 322, 324 and 332.

In some implementations, the wireless communication device adds a new field in the DCI formats with CRC scrambled by at least one of INT-RNTI, SFI-RNTI, TPC-PUSCH-RNTI, TPC-PUCCH-RNTI, TPC-SRS-RNTI, CI-RNTI, and PS-RNTI. Thus, in some implementations, the wireless communication device adds a new field for common DCI formats 2-1, 2-2, 2-3, 2-4, or 2-6. In some implementations, the new field is applied for each UE. In some implementations, each codepoint in the field contains an index X. In some implementations, X is an integer, X≥0. In some implementations, if X is not configured, the UE assumes that the DCI for the UE is not repeated.

In some implementations, the UE monitors PDCCH. Further, in some implementations, if received common DCIs during the predefined time period have the same format and contain the same index value X in the new field, the UE assumes that these DCIs are repeated. In response, in some implementations, the UE drops one repeated DCI. As one example, the UE can adopt the former one and drop the later one. In some implementations, a predefined time period mentioned above is N symbols or N slots defined in at least one of RRC parameter SearchSpace or ControlResourceSet. Alternatively, in some implementations for DCI format 2-2 and 2-3, the predefined time period is the time period that the TPC command for the latest PUSCH, PUCCH or SRS are accumulated. As one example, if DCI 312 and DCI 322 contains the same value 1 in the new field, the UE assumes DCI 312 and DCI 322 are repeated DCIs. Thus, in this example, the UE only accumulates a TPC command in DCI 312, DCI 324 and DCI 332 for the latest PUSCH, and ignores DCI 322.

Figure 4:
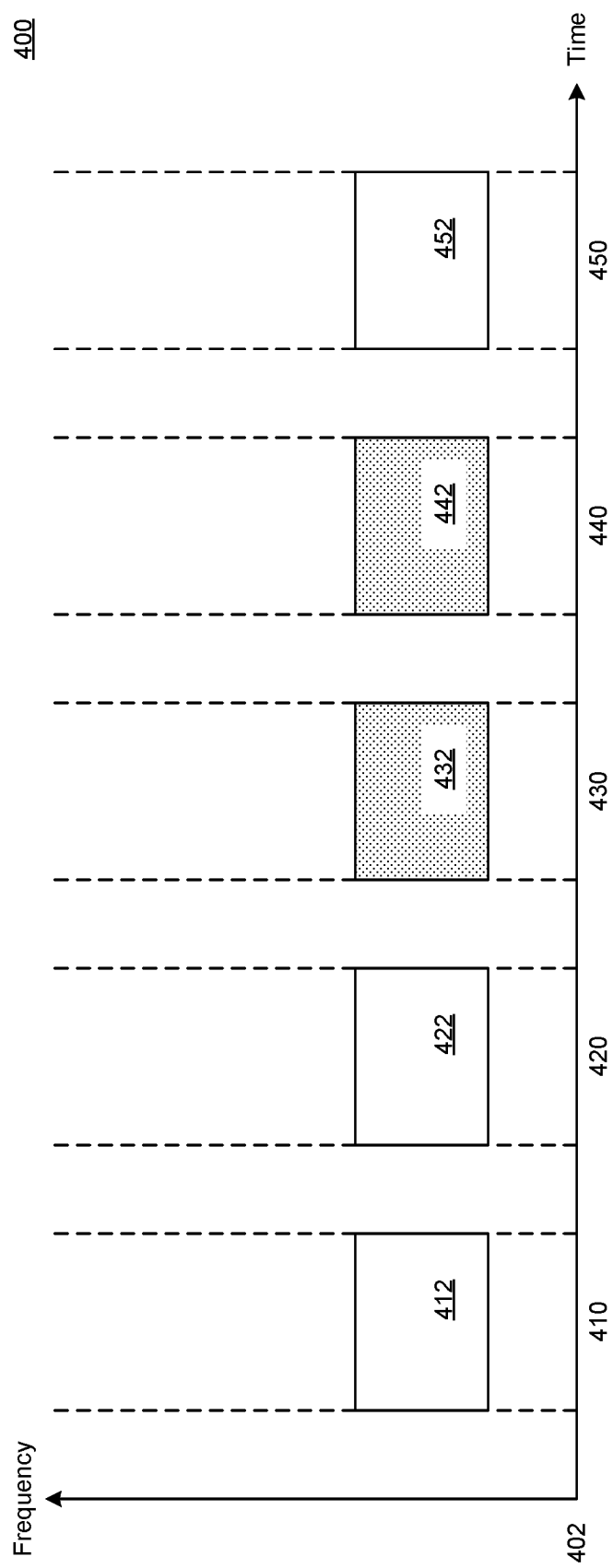
FIG. 4 illustrates a wireless communication device performing a second determination that a second downlink control information is a repeat of first downlink control information, in accordance with some implementations of the present disclosure.

FIG. 4 illustrates a wireless communication device performing a second determination that a second downlink control information is a repeat of first downlink control information, in accordance with some implementations of the present disclosure. As illustrated by way of example in FIG. 4, example wireless communication 400 extends in an x-axis time direction and a y-axis frequency direction, and includes CSS1 402 arranged in a first monitoring occasion 410, a second monitoring occasion 420, a third monitoring occasion 430, a fourth monitoring occasion 440, and a fifth monitoring occasion 450. In some implementations, the CSS1 402 includes downlink control information 412, 422, 432, 442, and 452.

In some implementations, the wireless communication device adds a new field in the DCI formats with CRC scrambled by at least one of INT-RNTI, SFI-RNTI, TPC-PUSCH-RNTI, TPC-PUCCH-RNTI, TPC-SRS-RNTI, CI-RNTI, and PS-RNTI. In some implementations, the wireless communication device adds a new field for common DCI format 2-1, 2-2, 2-3, 2-4, or 2-6. In some implementations, each codepoint in the field contains an index X. In some implementations, X equals to 0 or 1. In some implementations, gNB configures the repeated one common DCI format with the same index X and transmits them continuously. In some implementations, transmitting continuously is transmitting two adjacent DCIs with the same format with no other DCI with the other format transmitted by the BS or received by the UE therebetween. In some implementations, if the UE receives several continuous DCIs with the same DCI format in the predefined time period with the same index X, the UE assumes those DCIs are repeated DCIs. As one example, a single common DCI format is in the predefined time period, and the index X of 2 continuous DCIs with the same DCI format is reversed. In this example, where an X value changes from 0 to 1, or changes from 1 to 0, a UE assumes that it has received a new transmission. As another example, two continuous DCIs 412 and 422 have the same DCI format 2-2 as DCI 432 and DCI 442. Further, in this example, DCIs 432 and 442 have the same index 0, and the UE assumes DCIs 432 and 442 are repeated. Thus, in this example, the UE adopts the TPC command in DCI 432 and ignores the TPC command in DCI 442.

Figure 5:
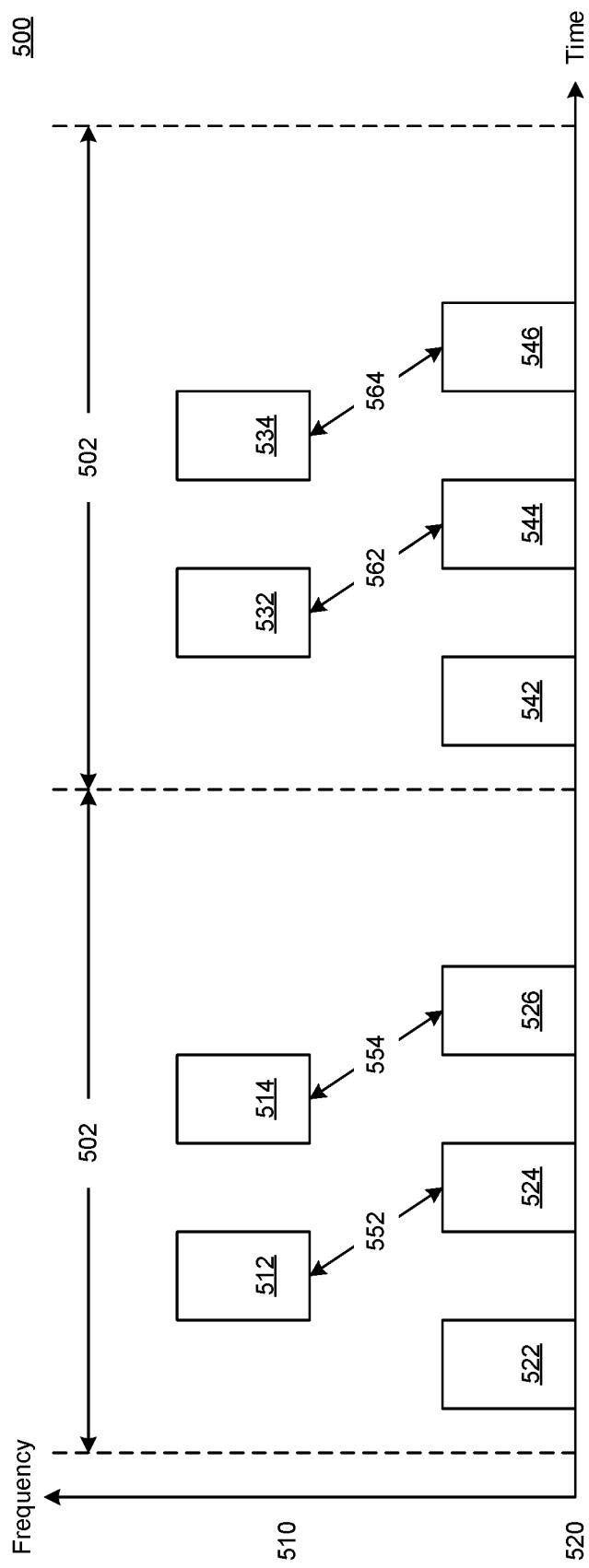
FIG. 5 illustrates a wireless communication device effecting a first relationship between corresponding SS sets based on a first monitoring period, in accordance with some implementations of the present disclosure.

FIG. 5 illustrates a wireless communication device effecting a first relationship between corresponding SS sets based on a first monitoring period, in accordance with some implementations of the present disclosure. As illustrated by way of example in FIG. 5, example wireless communication 500 extends in an x-axis time direction and a y-axis frequency direction, and includes CSS1 510 and CSS2 520. In some implementations, CSS1 510 is arranged in a first monitoring occasion 512 and a second monitoring occasion 514 in a first monitoring period 502. In some implementations, CSS1 510 is arranged in a third monitoring occasion 532 and a fourth monitoring occasion 534 in a second monitoring period 502. In some implementations, CSS2 520 is arranged in a first monitoring occasion 522, a second monitoring occasion 524, and a third monitoring occasion 526, in the first monitoring period 502. In some implementations, CSS2 520 is arranged in a fourth monitoring occasion 542, a fifth monitoring occasion 544, and a sixth monitoring occasion 546 in the second monitoring period 502.

In some implementations, the wireless communication device effects at least one association relationship between multiple SS sets. In some implementations, multiple monitoring occasions are associated within multiple SS sets 510 and 520. In some implementations, SS sets 510 and 520 are CSS sets or USS sets. In some implementations, a bitmap is configured in RRC signaling. In some implementations, the bitmap contains X bits, where X equals the number of monitoring occasions in one monitoring period in the first SS set 510 multiplied by the number of monitoring occasions in one monitoring period in the second SS set 520. In some implementations, each bit denotes one combination of the 2 monitoring occasions in 2 SS sets in one monitoring period. In some implementations, if the bit value is 1, then 2 corresponding monitoring occasions are associated. Similarly, in some implementations, if the bit value is 0, then 2 corresponding monitoring occasions are not associated. In some implementations, the RRC signaling mentioned above is associated with at least one of the SS sets 510 and 520, and a new RRC parameter. In some implementations, if the bitmap is configured in one of the SS sets, then an SS set ID of the other SS set is also configured. In some implementations, the UE expects the same monitoring period 502 for the 2 SS sets 510 and 520.

In some implementations, if 2 DCIs are detected blindly in 2 associated monitoring occasions, the UE assumes those 2 DCIs are repeated. In some implementations, the UE assumes DCI are repeated based on one or more conditions. Under a first condition, the 2 DCIs have the same DCI format. Under a second condition, the 2 DCIs are a common DCI having the same DCI format and the same payload. Under a third condition, the 2 DCIs are UE-specified DCIs, having the same DCI format and scheduled at the same PDSCH/PUSCH. In some implementations, if one or more DCIs are repeated, the UE can drop 1 repeated DCI. As one example, the UE can ignore the later received DCI.

In some implementations, the wireless communication device effects at least one relationship between multiple SS sets. In some implementations, multiple monitoring occasions are associated within multiple SS sets 510 and 520. In some implementations, the SS sets 510 and 520 are CSS sets or USS sets. In some implementations, gNB configures the relationship between the SS 510 and 520 sets and a time offset T. In some implementations, T is an integer and T≥0. In some implementations, the time offset T can be T symbols, or T slots, or T monitoring occasions, or the like. It is to be understood that the time offset is optional, and that if the time offset T is not configured, the UE assumes that the T value is 0. In a first offset configuration, the ID of the smallest indexed SS set and the time offset T are configured in the largest indexed SS set, in RRC parameter SearchSpace. In a second offset configuration, a new RRC parameter contains the related 2 SS sets ID and the time offset T.

In some implementations, the UE expects that multiple SS sets 510 and 520 have the same configured monitoring period 502. In some implementations, for each monitoring period 502, the multiple associated PDCCH monitoring occasions are in 2 SS sets 510 and 520. In some implementations, if the time offset T is T MOs, the calculated associated MO index in the largest indexed SS set equals the same MO index in the smallest indexed SS set+T. In some implementations, if the time offset is T symbols or T slots, the calculated time location of associated MO in the largest indexed SS set equals the time location of the MO in the smallest indexed SS set+T. Thus, in some implementations, the calculated time location of the associated monitoring occasion does not cross the boundary of the monitoring period.

In some implementations, the example wireless communication 500 includes no actual configured monitoring occasion on the calculated time location of the associated monitoring occasion. Further, in some implementations, the calculated associated MO index is not included in the largest indexed SS set. Thus, in some implementations, the UE assumes the nearest actual monitoring occasion is the associated PDCCH monitoring occasion. In some implementations, the nearest actual monitoring occasion is a predetermined monitoring location. A first predetermined monitoring occasion is after the calculated time location of the associated monitoring occasion in the corresponding SS set 510 or 520, and nearest to it, in one monitoring period. A second predetermined monitoring occasion is before the calculated time location of the associated monitoring occasion in the corresponding SS set, and nearest to it, in one monitoring period. In some implementations, a monitoring occasion in the largest indexed SS set can only be associated with 1 monitoring occasion in the smallest indexed SS set. In some implementations, 1 monitoring occasion in the largest indexed SS set can be associated with at most N monitoring occasions in the smallest indexed SS set. In some implementations, N is an integer. For example, N equals to 2. In some implementations, the smaller indexed MO in the smallest indexed SS set has the higher priority to associate with the other MO than the larger indexed MO.

In some implementations, if 2 DCIs are detected blindly in 2 associated monitoring occasions, the UE assumes those 2 DCIs are repeated based on one or more conditions. Under a first condition, 2 DCIs have the same DCI format. Under a second condition, 2 DCIs are a common DCI, having the same DCI format and the same payload. Under a third condition, 2 DCIs are UE-specified DCI, having the same DCI format and schedule at the same PDSCH/PUSCH. In some implementations, if one or more DCIs are repeated, the UE can drop 1 repeated DCI. As one example, the UE can ignore the later received DCI. As one example, the time offset is configured as 1 monitoring occasion, so MO1 512 and 532 and MO2 514 and 534 in SS1 510 are respectively associated within the same monitoring period with MO2 524 and 544 and MO3 526 and 546 in SS2 520, by associations 552, 554, 562 and 564.

Figure 6:
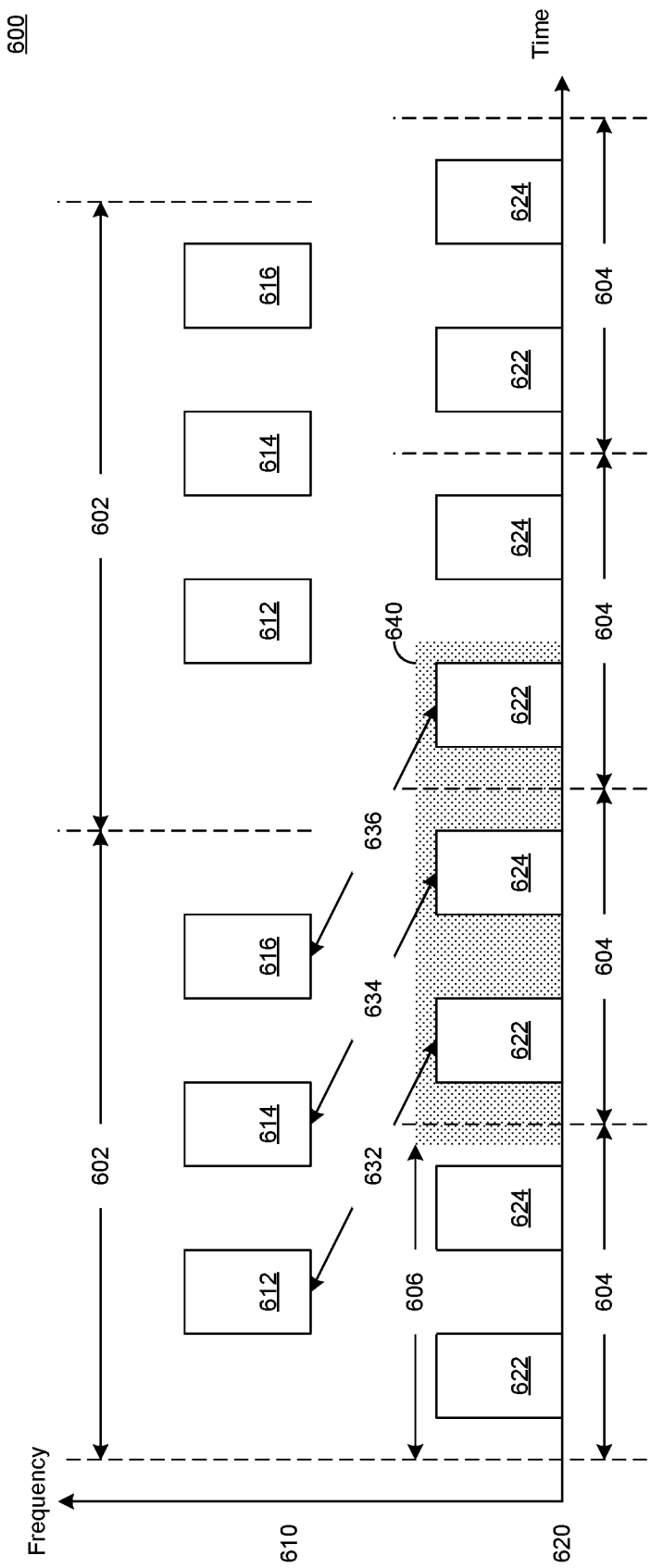
FIG. 6 illustrates a wireless communication device effecting at least one relationship between corresponding SS sets based on a first monitoring period and a second monitoring period, in accordance with some implementations of the present disclosure.

FIG. 6 illustrates a wireless communication device effecting at least one relationship between corresponding SS sets based on a first monitoring period and a second monitoring period, in accordance with some implementations of the present disclosure. As illustrated by way of example in FIG. 5, example wireless communication 500 extends in an x-axis time direction and a y-axis frequency direction, and includes CSS1 510 and CSS2 520. In some implementations, CSS1 610 is arranged in a first monitoring occasion 612, a second monitoring occasion 614, and a third monitoring occasion 616 in a first monitoring period 602. In some implementations, CSS2 620 is arranged in a first monitoring occasion 622 and a second monitoring occasion 624 in a second monitoring period 604. In some implementations, CSS1 520 includes time offset T 606 and a detection window 640.

In some implementations, the wireless communication device effects a relationship between multiple SS sets. In some implementations, multiple monitoring occasions are associated within these multiple SS sets. In some implementations, the SS sets 610 and 620 are CSS sets or USS sets. In some implementations, gNB configures one or more of a relationship between multiple SS sets, and a time offset T 606. In some implementations, T is an integer and T≥0. In some implementations, the time offset T 606 can be T symbols, or T slots, or T monitoring occasions. In some implementations, the wireless communication device defines a detection window 640. In some implementations, a time length of the detection window 640 is the monitoring period of the largest indexed SS set, or the smallest indexed SS set. In some implementations, the configurations in RRC signaling may be configured according to one or more configurations. In a first offset configuration, the ID of the smallest indexed SS set and the time offset T are configured in the larger indexed SS set, in RRC parameter SearchSpace. In a second offset configuration, a new RRC parameter contains the related 2 SS sets ID and the time offset T.

In some implementations, multiple associated PDCCH monitoring occasions are in multiple SS sets. In some implementations, a monitoring occasion in the smallest indexed SS set is associated with the monitoring occasions on a one-to-one basis in the detection window 640 in the largest indexed SS set. In some implementations, the start time of the detection window 640 is the time location of the first monitoring occasion or the first symbol of the monitoring period in the smallest indexed SS set plus the configured time offset T 606.

In some implementations, 1 monitoring occasion in the largest indexed SS set can only be associated with 1 monitoring occasion in the smallest indexed SS set. In some implementations, 1 monitoring occasion in the largest indexed SS set is associated with at most N monitoring occasions in the smallest indexed SS set. In some implementations, N is an integer. For example, N equals 2. In some implementations, the smaller indexed MO has a higher priority to associate with the MO than the larger indexed MO.

In some implementations, if 2 DCIs are detected blindly in 2 associated monitoring occasions, the UE assumes those 2 DCIs are repeated. In some implementations, the UE assumes DCI are repeated based on one or more conditions. Under a first condition, the 2 DCIs have the same DCI format. Under a second condition, the 2 DCIs are a common DCI having the same DCI format and the same payload. Under a third condition, the 2 DCIs are UE-specified DCIs, having the same DCI format and scheduled at the same PDSCH/PUSCH, or SRS, or CSI report and so on. In some implementations, if one or more DCIs are repeated, the UE can drop 1 repeated DCI. As one example, the UE can ignore the later received DCI.

Figure 7:
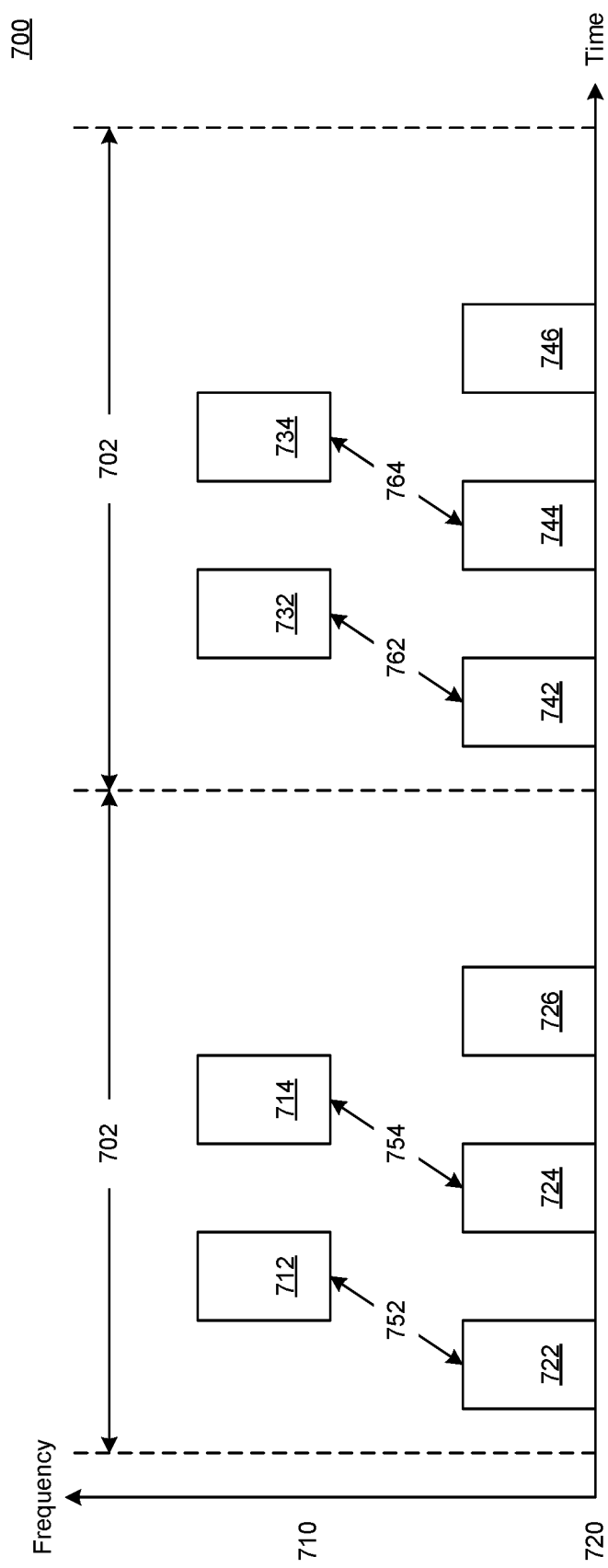
FIG. 7 illustrates a wireless communication device effecting a second relationship between corresponding SS sets based on a first monitoring period, in accordance with some implementations of the present disclosure.

FIG. 7 illustrates a wireless communication device effecting a second relationship between corresponding SS sets based on a first monitoring period, in accordance with some implementations of the present disclosure. As illustrated by way of example in FIG. 7, example wireless communication 700 extends in an x-axis time direction and a y-axis frequency direction, and includes CSS1 710 and CSS2 720. In some implementations, CSS1 710 is arranged in a first monitoring occasion 712 and a second monitoring occasion 714 in a first monitoring period 702. In some implementations, CSS1 710 is arranged in a third monitoring occasion 732 and a fourth monitoring occasion 734 in a second monitoring period 702. In some implementations, CSS2 720 is arranged in a first monitoring occasion 722, a second monitoring occasion 724, and a third monitoring occasion 726, in the first monitoring period 702. In some implementations, CSS2 720 is arranged in a fourth monitoring occasion 742, a fifth monitoring occasion 744, and a sixth monitoring occasion 576 in the second monitoring period 702.

In some implementations, the wireless communication device effects at least one association relationship 752, 754, 762 and 764 between multiple SS sets 510 and 520. In some implementations, multiple monitoring occasions are associated within these multiple SS sets. In some implementations, the 2 SS sets 510 and 520 have the same monitoring period. Thus, in some implementations, the first X monitoring occasions in 2 SS sets are associated on a one-to-one basis. In some implementations, X is an integer and X≥0. In some implementations, an X value cannot be greater than the minimum value of the number of monitoring occasions in at least one SS set. In some implementations, the configurations in RRC signaling may be configured according to one or more configurations. In a first signaling configuration, the ID of the smaller indexed SS set and the number of associated monitoring occasions X in the larger indexed SS set are configured in the larger indexed SS set, in RRC parameter SearchSpace. In a second signaling configuration, a new RRC parameter contains the related 2 SS sets ID, the time offset T, and the number of associated monitoring occasions X. In some implementations, X is not configured or X=0, and the wireless communication device generates no association relationship between the monitoring occasions in the 2 SS sets 510 and 520.

In some implementations, if 2 DCIs are detected blindly in 2 associated monitoring occasions, the UE assumes those 2 DCIs are repeated. In some implementations, the UE assumes DCI are repeated based on one or more conditions. Under a first condition, the 2 DCIs have the same DCI format. Under a second condition, the 2 DCIs are a common DCI having the same DCI format and the same payload. Under a third condition, the 2 DCIs are UE-specified DCIs, having the same DCI format and scheduled at the same PDSCH/PUSCH, or SRS, or CSI report and so on. In some implementations, if one or more DCIs are repeated, the UE can drop 1 repeated DCI. As one example, the UE can ignore the later received DCI.

Figure 8:
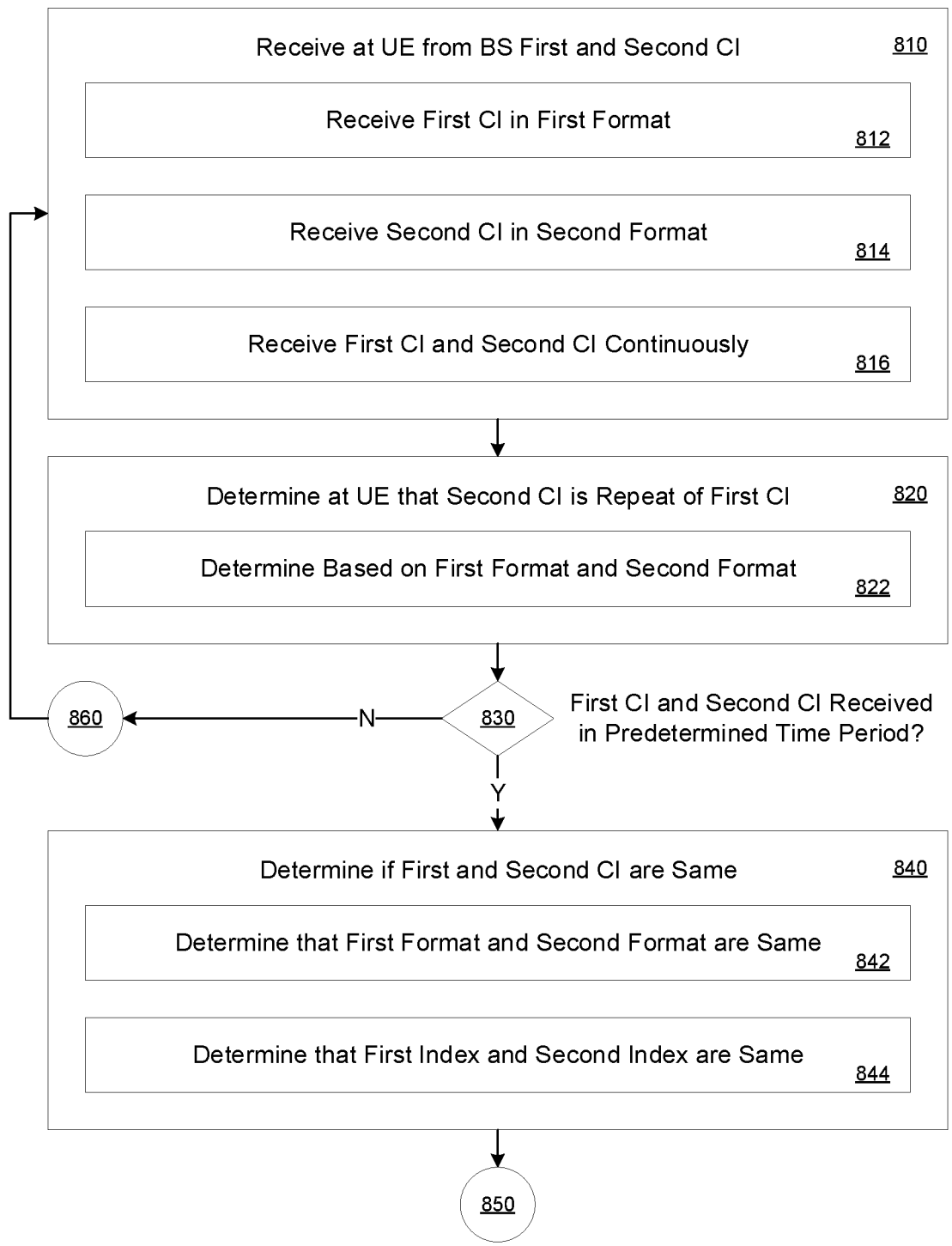
FIG. 8 illustrates an example method, in accordance with some implementations of the present disclosure.

FIG. 8 illustrates an example method, in accordance with some implementations of the present disclosure. In some implementations, at least one of the BS 202 and the UE 201 performs method 800 according to present implementations. In some implementations, the method 800 begins at 810.

At 810, the example system receives the first and second control information at the UE 201 from the BS 202. In some implementations, 810 includes at least one of 812, 814 and 816. At 812, the example system receives the first control information in a first format. At 814, the example system receives the second control information in a second format. At 816, the example system receives the first control information and the second control information continuously. The method 800 then continues to 820.

At 820, the example system determines at the UE 201 that the second control information is a repeat of the first control information. In some implementations, 820 includes 822. At 822, the first control information is determined based on the first format of the first control information and the second format of the second control information. The method 800 then continues to 830.

At 830, the example system determines at the UE 201 whether the first control information and the second control information are received in a predetermined time period. In some implementations, a predetermined time period corresponds to detection window 640. In accordance with a determination that the first control information and the second control information are received in a predetermined time period, the method 800 continues to 840. Alternatively, in accordance with a determination that the first control information and the second control information are not received in a predetermined time period, the method 800 continues to 860. At 860, the method 800 continues to 810.

At 840, the example system determines at the UE 201 if the first control information and the second control information are the same. In some implementations, 840 includes 842 and 844. At 842, the example system determines that the first format and the second format are the same. At 844, the example system determines that the first index and the second index are the same. In some implementations, the method 800 continues to 850.

Figure 9:
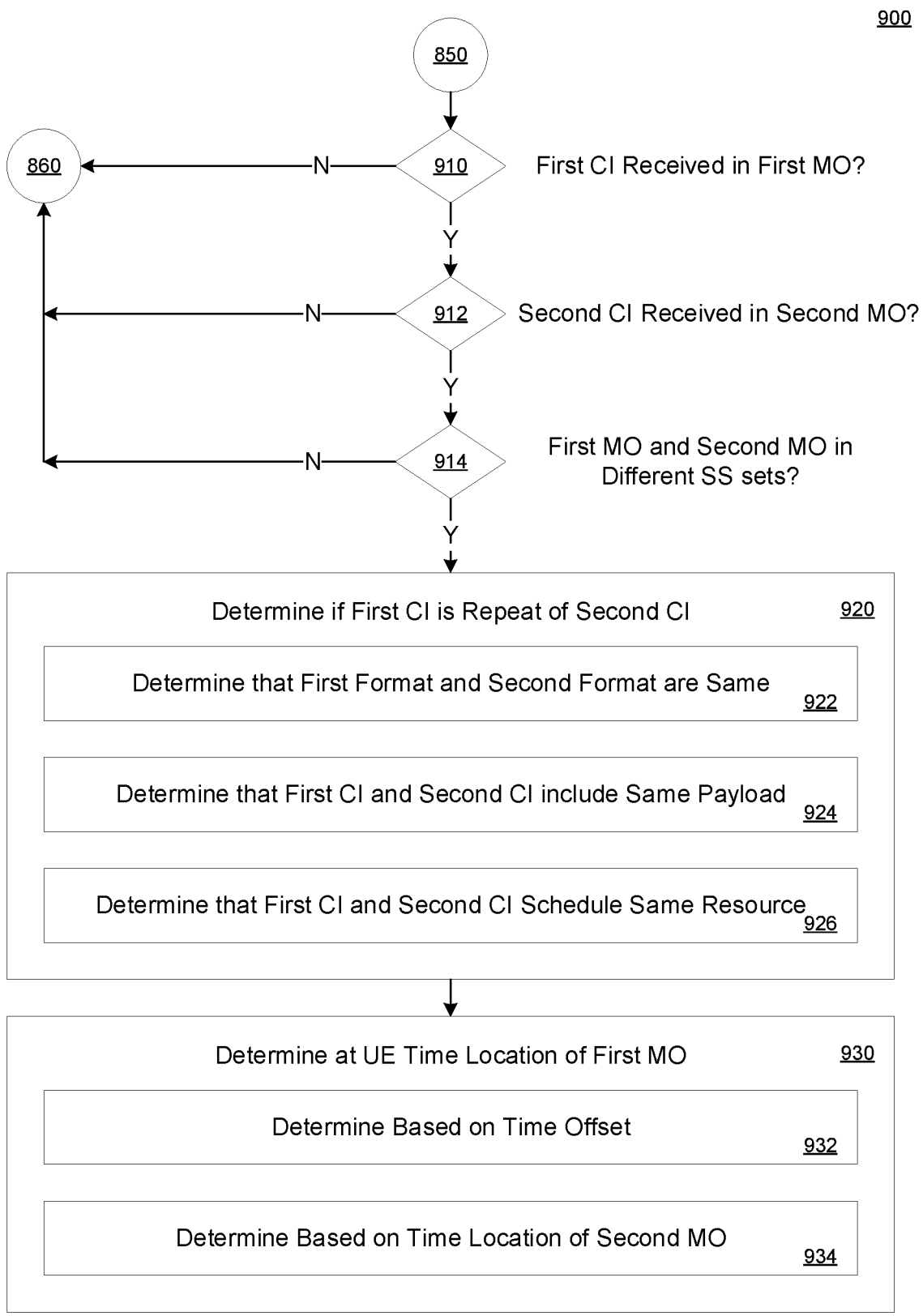
FIG. 9 illustrates an example method further to the example method of FIG. 8, in accordance with some implementations of the present disclosure.

FIG. 9 illustrates an example method, in accordance with some implementations of the present disclosure. In some implementations, at least one of the BS 202 and the UE 201 performs method 900 according to present implementations. In some implementations, the method 900 begins at 850. At 850, the method 900 continues to 910.

At 910, an example system determines at the UE 201 whether the first control information is received in a first monitoring occasion. In accordance with a determination that the first control information is received in the first monitoring occasion, the method 900 continues to 912. Alternatively, in accordance with a determination that the first control information is not received in the first monitoring occasion, the method 900 continues to 860. A 912, the example system determines at the UE 201 whether the second control information is received in the second monitoring occasion. In accordance with a determination that the second control information is received in the second monitoring occasion, the method 900 continues to 914. Alternatively, in accordance with a determination that the second control information is not received in the second monitoring occasion, the method 900 continues to 860. At 914, the example system determines at the UE 201 whether the first monitoring occasion and the second monitoring occasion are in different SS sets. In accordance with a determination that the first monitoring occasion and the second monitoring occasion are in different SS sets, the method 900 continues to 920. Alternatively, in accordance with a determination that the first monitoring occasion and the second monitoring occasion are not in different SS sets, the method 900 continues to 860.

At 920, the example system determines at the UE 201 if the first control information is a repeat of the second control information. In some implementations, 920 includes at least one of 922, 924 and 926. At 922, the example system determines that the first format and the second format are the same. At 924, the example system determines that the first control information and the second control information include the same payload. At 926, the example system determines that the first control information and the second control information are scheduled at the same resource. The method 900 then continues to step 930.

At step 930, the example system determines at the UE 201 at least one time location of the first monitoring occasion. In some implementations, 930 includes at least one of 932 and 934. At 932, the example system determines the time location based at least partially on a time offset. In some implementations, the time offset corresponds to time offset 606. At 934, the example system determines the time location based at least partially on a time location of the second monitoring occasion. In some implementations, the method 900 ends at 930.

Figure 10:
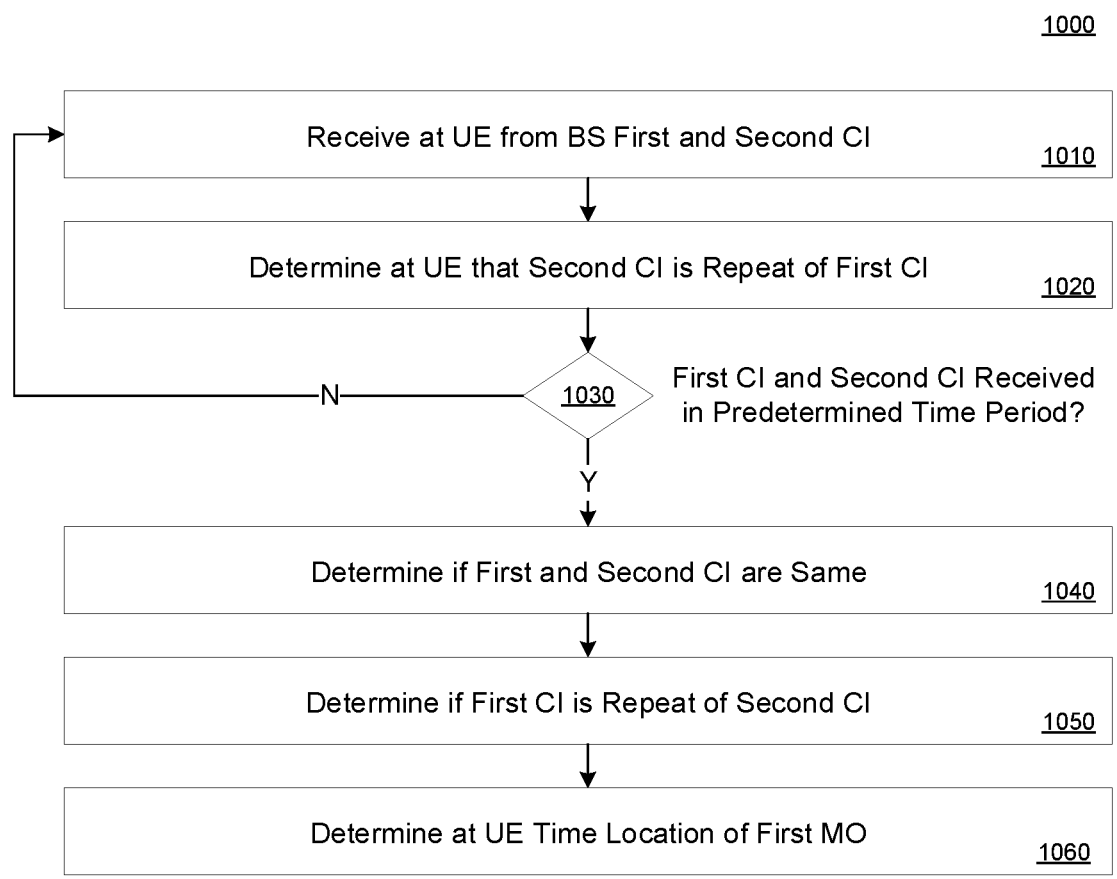
FIG. 10 illustrates a further example method, in accordance with some implementations of the present disclosure.

FIG. 10 illustrates a further example method, in accordance with some implementations of the present disclosure. In some implementations, at least one of the BS 202 and the UE 201 performs method 1000 according to present implementations. In some implementations, the method 1000 begins at 1010.

At 1010, the example system receives the first and second control information at the UE 201 from the BS 202. The method 1000 then continues to 1020. At 1020, the example system determines at the UE 201 that the second control information is a repeat of the first control information. The method 1000 then continues to 1030.

At 1030, the example system determines at the UE 201 whether the first control information and the second control information are received in a predetermined time period. In some implementations, a predetermined time period corresponds to detection window 640. In accordance with a determination that the first control information and the second control information are received in a predetermined time period, the method 1000 continues to 1040. Alternatively, in accordance with a determination that the first control information and the second control information are not received in a predetermined time period, the method 1000 continues to 1010.

At 1040, the example system determines at the UE 201 if the first control information and the second control information are the same. The method 1000 continues to 1050. At 1050, the example system determines at the UE 201 if the first control information is a repeat of the second control information. The method 1000 then continues to step 1060. At step 1060, the example system determines at the UE 201 at least one time location of the first monitoring occasion. In some implementations, the method 1000 ends at 1060.

While various implementations of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one implementation can be combined with one or more features of another implementation described herein. Thus, the breadth and scope of the present disclosure should not be limited by any of the above-described illustrative implementations.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according implementations of the present solution.

Additionally, memory or other storage, as well as communication components, may be employed in implementations of the present solution. It will be appreciated that, for clarity purposes, the above description has described implementations of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
    receiving, by a wireless communication device from a network, a first control information and a second control information, wherein:
       the first control information is received in a first Monitoring Occasion (MO);
       the first MO is in a first Search Space (SS) set of a plurality of SS sets;
       the second control information is received in a second MO;
       the second MO is in a second SS set of the plurality of SS sets; and
       the first SS set has a smaller SS set index than the second SS set in the plurality of SS sets, and
    wherein:
       the first SS set has a first monitoring period;
       the second SS set has a second monitoring period,
    wherein each MO in the first SS set, of a number of MOs in the first SS set, has a one-to-one mapping with a respective MO in the second SS set, of a number of MOs in the second SS set; and
    determining, by the wireless communication device, that the second control information is a repeat of the first control information.

2. The wireless communication method of claim 1, wherein the first control information and the second control information are Downlink Control Information (DCI) with a same DCI format.

3. The wireless communication method of claim 1, wherein a radio resource control (RRC) parameter indicates a SS set index of the first SS set, and a SS set index of the second SS set.

4. A wireless communication method, comprising:
    sending, by a network to a wireless communication device, a first control information and a second control information, wherein:
       the first control information is in a first Monitoring Occasion (MO);
       the first MO is in a first Search Space (SS) set of a plurality of SS sets;
       the second control information is in a second MO;
       the second MO is in a second SS set of the plurality of SS sets; and
       the first SS set has a smaller SS set index than the second SS set in the plurality of SS sets,
    wherein:
       the first SS set has a first monitoring period;
       the second SS set has a second monitoring period;
    wherein each MO in the first SS set, of a number of MOs in the first SS set, has a one-to-one mapping with a respective MO in the second SS set, of a number of MOs in the second SS set; and
    the first monitoring period and the second monitoring period are the same, and wherein the second control information is a repeat of the first control information.

5. The wireless communication method of claim 4, wherein the first control information and the second control information are Downlink Control Information (DCI) with a same DCI format.

6. The wireless communication method of claim 4, wherein a radio resource control (RRC) parameter indicates a SS set index of the first SS set, and a SS set index of the second SS set.

7. A wireless communication device, comprising:
    at least one processor configured to:
       receive, via a receiver from a network, a first control information and a second control information, wherein:
          the first control information is received in a first Monitoring Occasion (MO);
          the first MO is in a first Search Space (SS) set of a plurality of SS sets;
          the second control information is received in a second MO;
          the second MO is in a second SS set of the plurality of SS sets; and
          the first SS set has a smaller SS set index than the second SS set in the plurality of SS sets, and
       wherein:
          the first SS set has a first monitoring period;
          the second SS set has a second monitoring period;
       wherein each MO in the first SS set, of a number of MOs in the first SS set, has a one-to-one mapping with a respective MO in the second SS set, of a number of MOs in the second SS set; and
          the first monitoring period and the second monitoring period are the same, and
       determining, by the wireless communication device, that the second control information is a repeat of the first control information.

8. The wireless communication device of claim 7, wherein the first control information and the second control information are Downlink Control Information (DCI) with a same DCI format.

9. The wireless communication device of claim 7, wherein a radio resource control (RRC) parameter indicates a SS set index of the first SS set, and a SS set index of the second SS set.

10. A network device, comprising:
    at least one processor configured to:
       send, via a transmitter to a wireless communication device, a first control information and a second control information, wherein:
          the first control information is in a first Monitoring Occasion (MO);
          the first MO is in a first Search Space (SS) set of a plurality of SS sets;
          the second control information is in a second MO;
          the second MO is in a second SS set of the plurality of SS sets; and
          the first SS set has a smaller SS set index than the second SS set in the plurality of SS sets,
       wherein:
          the first SS set has a first monitoring period;

the second SS set has a second monitoring period;
wherein each MO in the first SS set, of a number of MOs in the first SS set, has a one-to-one mapping with a respective MO in the second SS set, of a number of MOs in the second SS set; and
the first monitoring period and the second monitoring period are the same, and wherein the second control information is a repeat of the first control information.

11. The network device of claim 10, wherein the first control information and the second control information are Downlink Control Information (DCI) with a same DCI format.

12. The network device of claim 10, wherein a radio resource control (RRC) parameter indicates a SS set index of the first SS set, and a SS set index of the second SS set.

\* \* \* \* \*